(12) United States Patent
German et al.

(10) Patent No.: US 6,987,920 B1
(45) Date of Patent: Jan. 17, 2006

(54) WAVEGUIDE STRUCTURES AND METHODS

(75) Inventors: Kristine A. German, Webster, NY (US); Peter M. Gulvin, Webster, NY (US); Joel A. Kubby, Rochester, NY (US); Pinyen Lin, Rochester, NY (US); Xueyuan Liu, Webster, NY (US); Yao Rong Wang, Webster, NY (US)

(73) Assignee: Xerox Corporation, Stamford, CT (US)

( * ) Notice: Subject to any disclaimer, the term of this patent is extended or adjusted under 35 U.S.C. 154(b) by 18 days.

(21) Appl. No.: 10/878,834

(22) Filed: Jun. 28, 2004

(51) Int. Cl.
*G02B 6/10* (2006.01)

(52) U.S. Cl. .................... 385/129; 385/132; 216/24

(58) Field of Classification Search ............ 385/46–50, 385/129–132; 65/386; 216/24; 264/1.24–1.29
See application file for complete search history.

(56) References Cited

U.S. PATENT DOCUMENTS

| | | | |
|---|---|---|---|
| 5,148,134 A | 9/1992 | Krill et al. ................. 333/242 |
| 5,570,442 A | 10/1996 | Arii et al. ..................... 385/46 |
| 5,719,976 A | 2/1998 | Henry et al. .................. 385/50 |
| 5,937,113 A | 8/1999 | He et al. ....................... 385/11 |
| 6,256,435 B1 | 7/2001 | Albert et al. ................. 385/37 |
| 6,580,863 B2 * | 6/2003 | Yegnanarayanan et al. . 385/132 |
| 6,628,854 B1 | 9/2003 | Koh et al. .................... 385/14 |
| 6,690,863 B2 | 2/2004 | Deliwala ..................... 385/50 |
| 6,890,450 B2 * | 5/2005 | Naydenkov et al. .......... 216/24 |

OTHER PUBLICATIONS

Xu et al., "Control and Compensation of Birefringence in SOI Waveguides", IEEE, 2003, pp. 590-591.
Xu et al., "Control of SOI Waveguide Polarization Properties For Microphotonic Applications", IEEE, 2003, pp. 46.

* cited by examiner

*Primary Examiner*—Phan T. H. Palmer
(74) *Attorney, Agent, or Firm*—Gibb I.P. Law Firm, LLC; Lloyd F. Bean

(57) ABSTRACT

A waveguide structure has a base having a base height (h) above a substrate and a rectangular waveguide having a waveguide height (H) above the substrate and a waveguide width (W) between opposing sides of the waveguide.

21 Claims, 4 Drawing Sheets

WAVEGUIDE STRUCTURES AND METHODS

BACKGROUND AND SUMMARY

Embodiments herein generally relate to waveguides that are used to direct and control light. Light has two polarizations, and can propagate in a media (such as a silicon waveguide) at two different speeds for the two polarizations. For a rib/ridge waveguide, the two polarized modes are generally referred to as the transverse electric (TE) and transverse magnetic (TM) modes. The two modes may see the same media differently, as the effective refractive index for the two polarizations may differ. The difference in the effective refractive index could be the result of the symmetry of the media, or, in the case of silicon waveguides, the result of different boundary conditions for the two polarizations. The difference in the refractive index of the two polarizations can cause various adverse effects for an optical communication system and if this difference is not properly compensated for, it will cause adverse effects such as polarization mode dispersion that causes bit rate errors.

In an arrayed waveguide grating system, such as a demultiplexer, the difference in refractive index will cause the demultiplexer wavelengths to shift away from one another for the two polarizations. Such a shift will increase the crosstalk between adjacent communication channels and limit bandwidth. In particular, the difference in the refractive index for the two polarizations will cause a relative shift for the demultiplexed wavelengths:

$$\delta\lambda = \lambda_0 \frac{n_{te} - n_{tm}}{n_{te}} \quad (1)$$

where $\lambda_0$ is the center wavelength, and $n_{te}$ and $n_{tm}$ are the effective index for the TE and the TM mode, respectively.

In optical communications using wavelength division multiplexing (WDM), each wavelength channel typically uses a narrow band of wavelengths, and the separation between the channels is in the order of 1 nm. With increasing use of broadband, the channel separation could even get smaller. For $\lambda_0$=1550 nm, and $n_{te}$≈3.42, as typically used, a small difference in $n_{te}$ and $n_{tm}$ could result in significant performance deterioration of the system through channel cross talk. Many compensation methods have been proposed. These include the insertion of a half-wave plate in the middle of the waveguide array, dispersion matching with adjacent diffraction orders, special layer structures, insertion of a waveguide section that compensates for the polarization difference in the phase array, adding a polarization splitter at the input of the arrayed waveguide (AWG), and making a prism-shaped region at the star coupler (combiner) of the demultiplexer. While all these methods reduce or eliminate the polarization dependence, they all add significant complexity to the AWG fabrication, and for many proposed methods, they incur considerable insertion loss.

Aspects of embodiments include forming a waveguide structure on a substrate, where there is formed a base to a base height (h) above the substrate and a rectangular waveguide to a waveguide height (H) above the substrate and a waveguide width (W) between opposing sides of the waveguide. Reference, for example, a waveguide structure with the following features:

$$H-4 \leq (W-3)^2; \quad (1)$$

$$H-1 \geq (W-4)^2; \quad (2)$$

$$H \leq 1.7*h+2.9; \text{ and} \quad (3)$$

$$H \geq 0.87*h+1.8, \quad (4)$$

where:
- H is the waveguide height above the substrate;
- W is the waveguide width between opposing sides of the waveguide;
- h is the base height above the substrate; and
- \* represents multiplication.

Examples of the base height (h) are broadly from about 1 um to about 3 um above the substrate; more narrowly from about 1.5 um to about 2.5 um above the substrate; and in a specific embodiment about 2 um above the substrate. Examples of the waveguide height (H) are broadly from about 2 um to about 7 um above the substrate; more narrowly from about 3 um to about 7 um above the substrate; and in a specific embodiment about 5 um above the substrate. Examples of the waveguide width (W) are broadly from about 2 um to about 7 um; more narrowly from about 4 um to about 7 um; and in one embodiment about 6 um.

Light traveling through the waveguide comprises two polarized modes known as transverse electric (TE) and transverse magnetic (TM) modes. Producing a zero TE-TM shift was a somewhat hit or miss proposition that varies depending upon the specific requirements of each design. Using a trial and error method to vary waveguide dimensions in order to obtain near zero TE-TM shift is costly both in terms of time and resource, as each waveguide with different dimension h and H requires different etching depth or wafer thickness. Conventionally, there were no explicit rules regarding what combination of different sizes would produce a zero TE-TM shift. Indeed, as shown by the following references, which are incorporated herein by reference, conventional wisdom abandoned any type of formulation and instead required the inclusion of additional structures such as a half-wave plate in the middle of the waveguide array (H. Takashashi, Y. Hibino, and I. Nishi, Opt. Lett., Vol. 17, p. 499–501 (1992)), dispersion matching with adjacent diffraction orders (M. Zirngibl, C. H. Joyner, L. W. Stulz, T. Gaigge, and C. Dragone, Electron. Lett., Vol. 29, 201–202 (1992)), a special layer structure (H. Bissessur, F. Gaborit, B. Martin, P. Pagnod-Rossiaux, J. L. Peyre and M. Renaud, Electron. Lett., Vol. 30, p. 336–337 (1994)), insertion of a waveguide section that compensates the polarization difference in the phase array (M. Zirngibl, C. H. Joyner, and P. C. Chou, Electron. Lett., Vol. 31, p. 1662–1664 (1995)), adding a polarization splitter at the input of the AWG (M. K. Smith and C. van Dam, IEEE Journal of Selected Topics in Quantum Electronics, Vol. 5, p. 236–250 (1996)), and/or making a prism-shaped region at the star coupler (combiner) of the demultiplexer in order to consistently accomplish a zero TE-TM shift (U.S. Pat. No. 5,937,113 to He et al.). Embodiments herein go beyond simple routine experimentation and have created a methodology that will allow virtually any design to be polarization insensitive without requiring additional structures such as a half-wave plate, dispersion matching, special layers, compensating sections, a polarization splitter, prism-shaped devices, and other devices.

DETAILED DESCRIPTION

Figure 1:
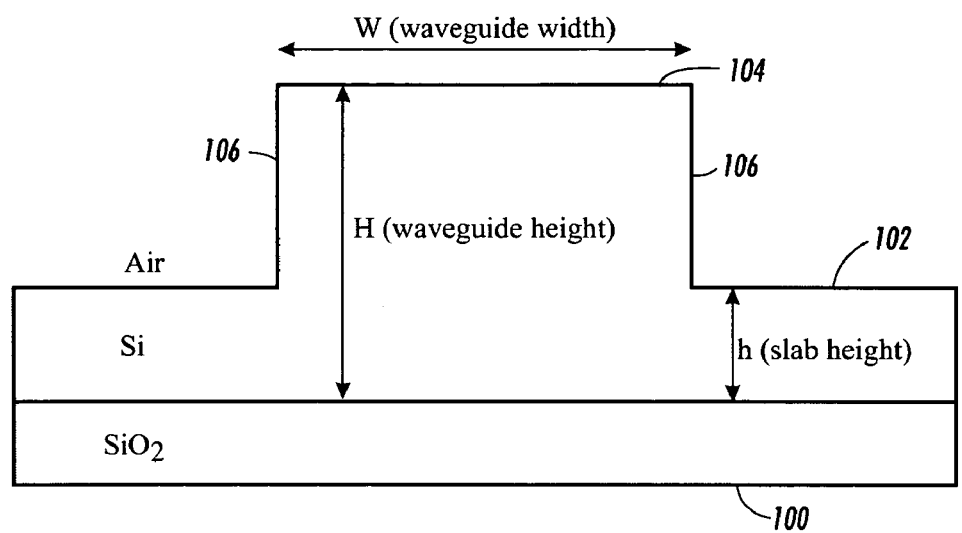
FIG. 1 is a diagram of a cross-sectional geometry of a rectangular rib/ridge waveguide.

According to various exemplary embodiments of systems and methods illustrated herein, a polarization insensitive design space for waveguides and arrayed waveguide grating systems and can be used in, for example, silicon-on-insulator (SOI) micro electromechanical system (MEMS) technology to compensate and to minimize bit rate errors and crosstalk. This polarization insensitive waveguide structure is the basic building block of many components such as an AWG and a switch. These components are the building blocks of many optical network components such as routers and optical add/drop multiplexers that are used by many wavelength division multiplexing (WDM) and dense wavelength division multiplexing (DWDM) technologies. The base geometry can be T-shaped in cross-section, as shown in FIG. 1, and has optimum width and height parameter ranges. By optimizing the ratio between the width and height of the waveguide and the height of base, the TE-TM wavelength shift is minimized to within current telecom industry allowed drifting of 0.2 nm.

The birefringence in a SOI waveguide arises from the different boundary condition for the TE and the TM mode. With a proper choice of the cross section geometry, the birefringence can be minimized or eliminated. A rectangular rib/ridge geometry is shown in FIG. 1.

Also in various exemplary embodiments, a base 102 is formed on a substrate 100 to a base height (h) above the substrate 100. A rectangular waveguide 104 is then formed on, or simultaneously with, the base 102 to have a waveguide height (H) above the substrate 100 and a waveguide width (W) between opposing sides 106 of the waveguide. Reference, for example, a waveguide structure having the following features:

$$H-4 \leq (W-3)^2; \tag{1}$$

$$H-1 \geq (W-4)^2; \tag{2}$$

$$H \leq 1.7*h+2.9; \text{ and} \tag{3}$$

$$H \geq 0.87*h+1.8 \tag{4}$$

where:
H is the waveguide height above the substrate;
W is the waveguide width between opposing sides of the waveguide; and
h is the base height above the substrate; and
* represents multiplication.

Also reference, for example, a waveguide structure having the following features:

$$H-4 < (W-3)^2; \tag{1}$$

$$H-1 > (W-4)^2; \tag{2}$$

$$H < 1.7*h+2.9; \text{ and} \tag{3}$$

$$H > 0.87*h+1.8 \tag{4}$$

Examples of the base height (h) are broadly from about 1 um to about 3 um above the substrate; more narrowly from about 1.5 um to about 2.5 um above the substrate; and in a specific embodiment about 2 um above the substrate. Examples of the waveguide height (H) are broadly from about 2 um to about 7 um above the substrate; more narrowly from about 3 um to about 7 um above the substrate; and in a specific embodiment about 5 um above the substrate. Examples of the waveguide width (W) are broadly from about 2 um to about 7 um; more narrowly from about 4 um to about 7 um; and in one embodiment about 6 um.

Thus, in an exemplary embodiment, a value equal to the waveguide height (H) minus 4 is less than or equal to the waveguide width (W) minus 3 all squared; and the waveguide height (H) minus 1 is greater or equal to than the waveguide width minus 4 all squared. Additionally, the waveguide height (H) is less than or equal to 1.7 times the base height (h) plus 2.9; and the waveguide height (H) is greater than or equal to 0.87 times the base height (h) plus 1.8.

In one example that applies the foregoing, if the waveguide width (W) is selected to be 6 um and the base height (h) is selected to be 2 um, the range for the waveguide height (H) can be calculated as follows:

$$H \leq (6-3)^2+4, \text{ which results in } H \leq 13 \text{ um}; \tag{1}$$

$$H \geq (6-4)^2+1, \text{ which results in } H \geq 5 \text{ um}; \tag{2}$$

$$H \leq 1.7*2+2.9, \text{ which results in } H \leq 6.3 \text{ um}; \text{ and} \tag{3}$$

$$H \geq 0.87*2+1.8, \text{ which results in } H \geq 3.54 \text{ um}. \tag{4}$$

Therefore, in the above example where the waveguide width (W) is selected to be 6 um and the base height (h) is selected to be 2 um, the range for the waveguide height (H) that produces less than 0.2 nm TE-TM wavelength shift is between 5 um and 6.3 um.

The waveguide 104 and base 102 can comprise, for example, silicon (single crystal silicon or polycrystal silicon, doped or undoped) and the substrate 100 comprises an insulator (such as an oxide, a nitride, glasses, and other similar materials), thereby forming a silicon-on-insulator (SOI) waveguide structure. The substrate 100, base 102, and rectangular waveguide 104 can be formed using many different conventional processing techniques including, for example, silicon deposition processing, oxidation, photolithographic masking and etching processing, and others. For example, see the manufacturing methods discussed in U.S. Pat. No. 6,690,863, the disclosure of which is fully incorporated herein by reference. With the foregoing features, the waveguide structure shown in FIG. 1 allows a maximum of 0.2 nm TE-TM wavelength shift. In one embodiment, the waveguide height (H) can be from about 2 um to about 7 um, the waveguide width (W) can be from about 2 um to about 7 um, and the base height (h) can be from about 1 um to about 3 um.

Figure 2:
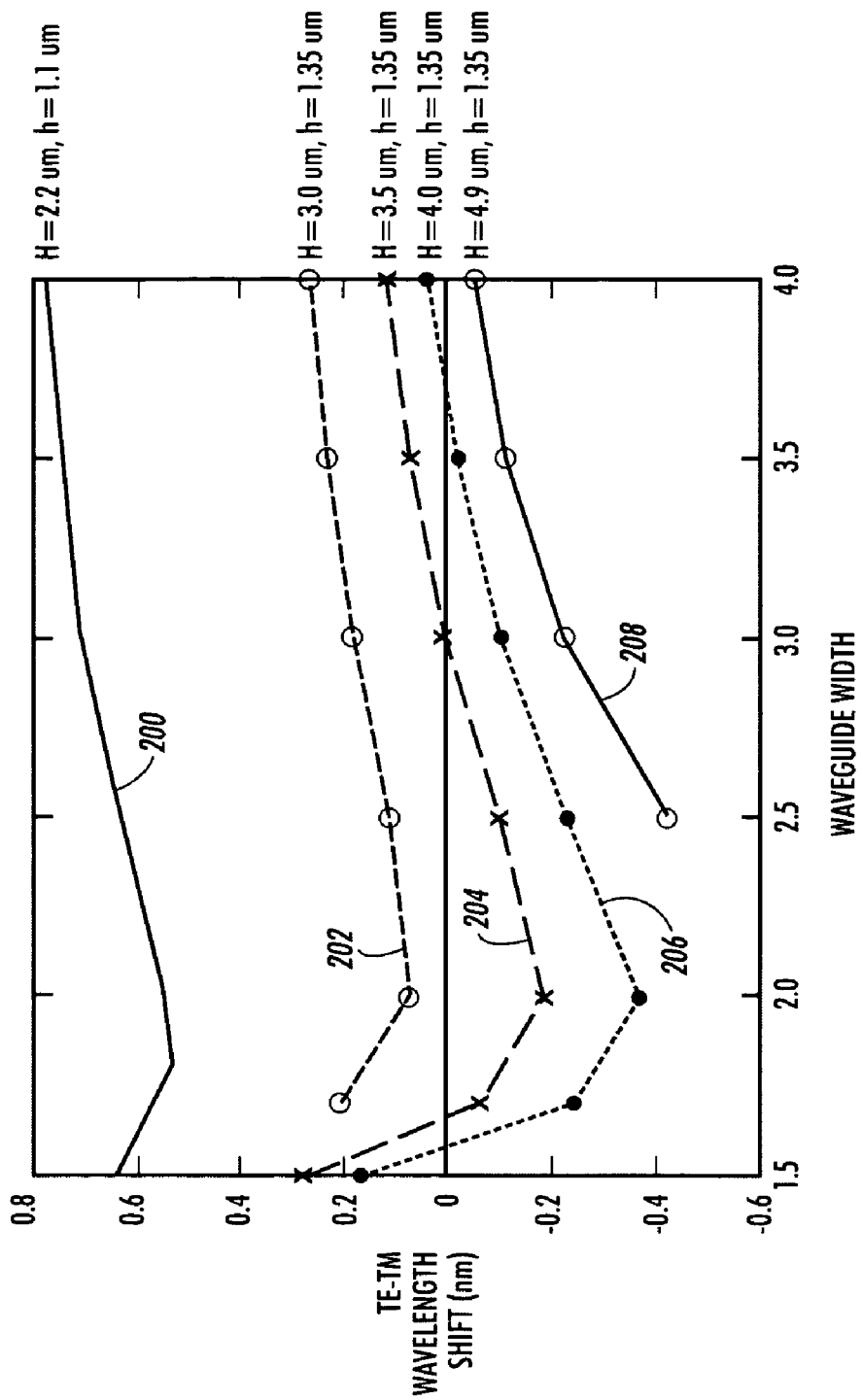
FIG. 2 is a graph illustrating TE-TM wavelength shift from Eq. (1) as a function of waveguide height and waveguide width.
Figure 3:
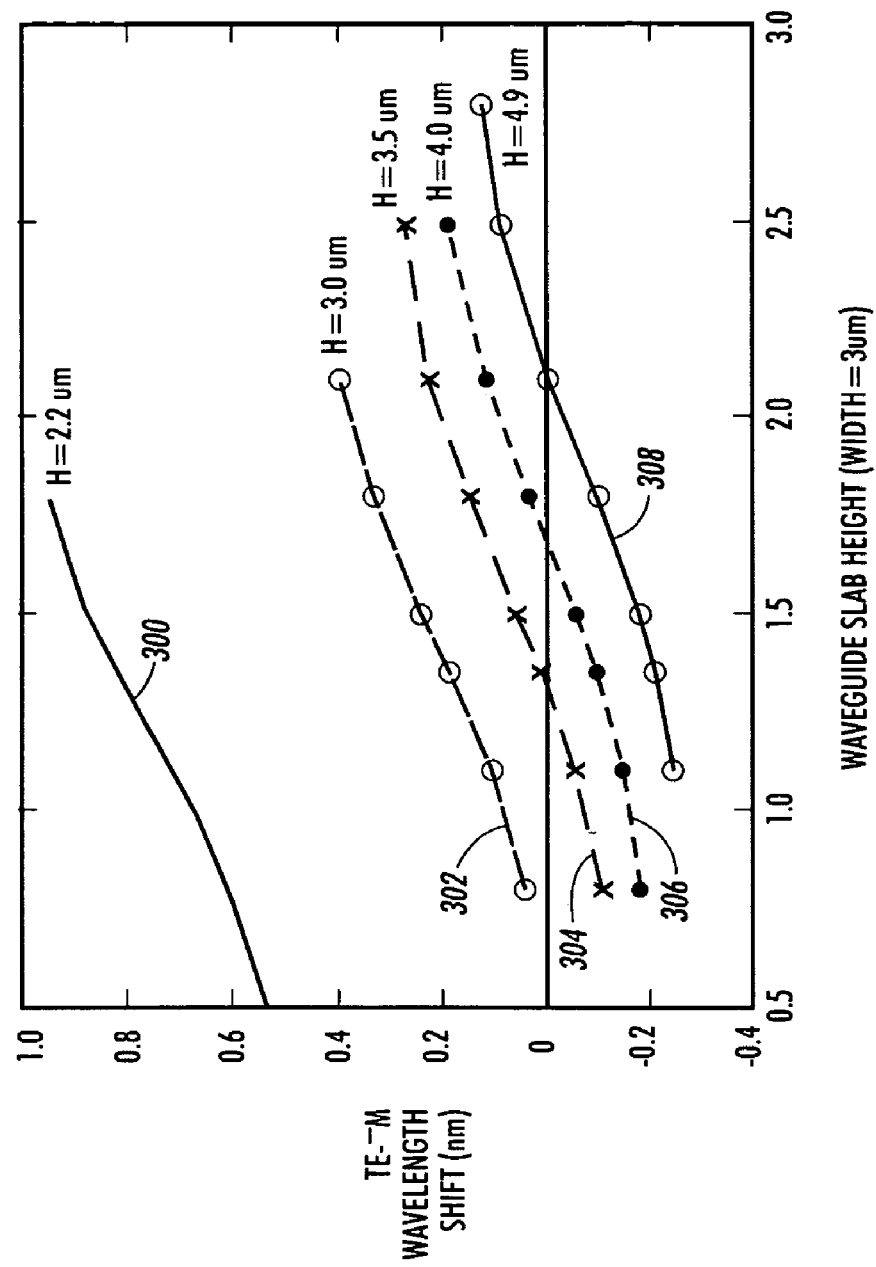
FIG. 3 is a graph illustrating TE-TM wavelength shift from Eq. (1) as a function of waveguide height and waveguide slab height.

FIGS. 2 and 3 illustrate how these systems and methods provide a design space for AWGs that are made from SOI rib/ridge waveguides which is polarization insensitive. More specifically, FIGS. 2 and 3 are graphs illustrating TE-TM wavelength shift from Eq. (1) as a function of waveguide height and waveguide width for different base heights. In FIG. 2, the slab height (base height) and waveguide height are shown using (h) and (H) adjacent each of the different curves 200–208. In FIG. 3, all base heights (h) are 2.2 um and the waveguide heights (H) are as shown for curves 300–308. These figures illustrate that it is possible to produce a design that compensates for birefringence. For example, in FIG. 2, in curve 204, which represents a waveguide height (H) of 3.5 um and a base height of 1.35 um, when the waveguide width is 3 um, the TE-TM shift is zero. Similarly, for curve 308, which has a base height of 2.2 um and a waveguide height (H) of 4.9 um, when the waveguide width is 2 um, the TE-TM shift is zero.

Thus, FIGS. 2 and 3 illustrate that there are a number of features that produce nearly zero TE-TM shift. However, conventionally there is not believed to be a specific formulation that would permit a designer to consistently produce a design that resulted in the zero TE-TM shift.

Figure 4:
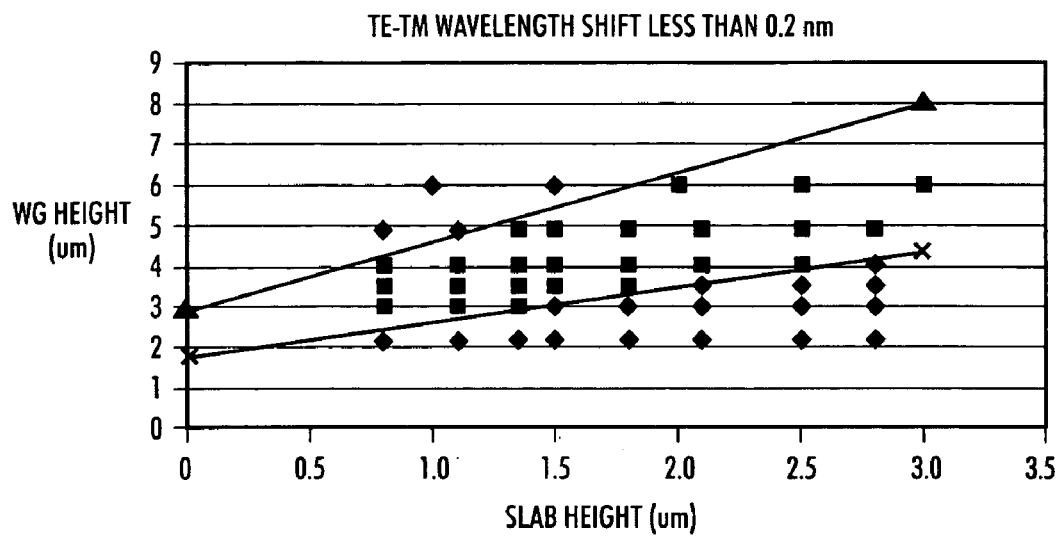
FIG. 4 is a graph illustrating design domain for TE-TM vavelength shift less than 0.2 nm.
Figure 5:
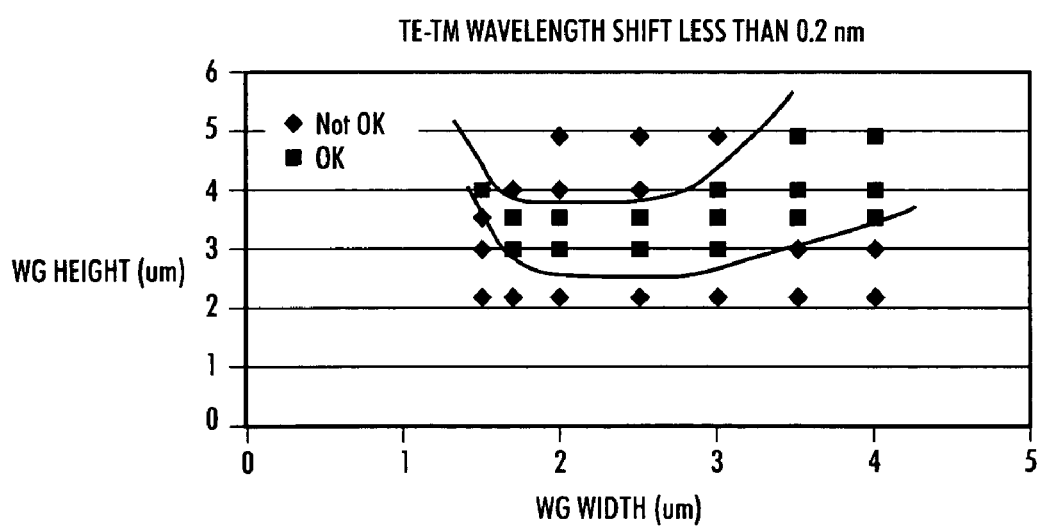
FIG. 5 is a graph illustrating design domain for TE-TM wavelength shift less than 0.2 nm.

FIGS. 4 and 5 are graphs illustrating design domains for TE-TM wavelengths that shift less than 0.2 nm. The squares in FIGS. 4 and 5 represent criterion that satisfy this 0.2 um maximum TE-TM shift requirement and are consistent with the embodiments shown herein, while the diamonds represent criteria outside this maximum that do not comply with the embodiments herein. The compilation of data herein provides that rectangular silicon-on-insulator structures that comply with the features of the embodiments herein will consistently produce an approximate zero TE-TM shift.

While the foregoing has been described in conjunction with various exemplary embodiments, it is to be understood that many alternatives, modifications and variations would be apparent to those skilled in the art. Accordingly, Applicants intend to embrace all such alternatives, modifications and variations that follow in the spirit and scope of this invention.

What is claimed is:

1. A waveguide comprising:
    a substrate; and
    a waveguide structure on said substrate, said waveguide structure comprising a base and a rectangular waveguide,
    wherein said base has a base height (h) above said substrate,
    wherein said rectangular waveguide has a waveguide height (H) above said substrate and a waveguide width (W) between opposing sides of said waveguide,
    wherein said waveguide structure has the following features:

$$H-4 \leq (W-3)^2; \tag{1}$$

$$H-1 \geq (W-4)^2; \tag{2}$$

$$H \leq 1.7*h+2.9; \text{ and} \tag{3}$$

$$H \geq 0.87*h+1.8. H, \tag{4}$$

wherein * represents multiplication.

2. The waveguide according to claim 1, wherein said waveguide structure provides a transverse electric-transverse magnetic (TE-TM) wavelength shift within 0.2 nm.

3. The waveguide according to claim 1, wherein:
    said waveguide height (H) is from about 2 um to about 7 um above said substrate;
    said waveguide width (W) is from about 2 um to about 7 um between opposing sides of said waveguide; and
    said base height (h) is from about 1 um to about 3 um.

4. The waveguide according to claim 1, wherein:
    said waveguide height (H) is from about 3 um to about 7 um above said substrate;
    said waveguide width (W) is from about 4 um to about 7 um between opposing sides of said waveguide; and
    said base height (h) is from about 1.5 um to about 2.5 um.

5. The waveguide according to claim 1, wherein:
    said waveguide height (H) is about 5 um above said substrate;
    said waveguide width (W) is about 6 um between opposing sides of said waveguide; and
    said base height (h) is about 2 um.

6. The waveguide according to claim 1, wherein said waveguide structure comprises silicon comprising one of single crystal silicon and polycrystal silicon, wherein said silicon is one of doped and undoped, and wherein said substrate comprises an insulator comprising one of an oxide, a nitride, and a glass.

7. The waveguide according to claim 1, wherein said waveguide structure comprises a polarization insensitive waveguide.

8. A waveguide comprising:
    a substrate; and
    a waveguide structure on said substrate, said waveguide structure comprising a base and a rectangular waveguide,
    wherein said base has a base height (h) from about 1 um to about 3 um above said substrate,
    wherein said rectangular waveguide has a waveguide height (H) from about 2 um to about 7 um above said substrate and a waveguide width (W) from about 2 um to about 7 um between opposing sides of said waveguide,
    wherein said waveguide structure has the following features:

$$H-4 \leq (W-3)^2; \tag{1}$$

$$H-1 \geq (W-4); \tag{2}$$

$$H \leq 1.7*h+2.9; \text{ and} \tag{3}$$

$$H \geq 0.87*h+1.8. \tag{4}$$

9. The waveguide according to claim 8, wherein said waveguide structure has the following features:

$$H-4 < (W-3)^2; \tag{1}$$

$$H-1 > (W-4)^2; \tag{2}$$

$$H < 1.7*h+2.9; \text{ and} \tag{3}$$

$$H > 0.87*h+1.8. \tag{4}$$

10. The waveguide according to claim 8, wherein:
    said waveguide height (H) is from about 3 um to about 7 um above said substrate;
    said waveguide width (W) is from about 4 um to about 7 um between opposing sides of said waveguide; and
    said base height (h) is from about 1.5 um to about 2.5 um.

11. The waveguide according to claim 8, wherein:
    said waveguide height (H) is about 5 um above said substrate;
    said waveguide width (W) is about 6 um between opposing sides of said waveguide; and
    said base height (h) is about 2 um.

12. The waveguide according to claim 8, wherein said waveguide structure provides a transverse electric-transverse magnetic (TE-TM) wavelength shift within 0.2 nm.

13. The waveguide according to claim 8, wherein said waveguide structure comprises silicon comprising one of single crystal silicon and polycrystal silicon, wherein said silicon is one of doped and undoped, and wherein said substrate comprises an insulator comprising one of an oxide, a nitride, and a glass.

14. The waveguide according to claim 8, wherein said waveguide structure comprises a polarization insensitive waveguide.

15. A method of forming a polarization insensitive waveguide, said method comprising:

forming a substrate; and forming a waveguide structure on said substrate, said forming of said waveguide structure comprising forming a base to a base height (h) above said substrate and forming a rectangular waveguide to a waveguide height (H) above said substrate and a waveguide width (W) between opposing sides of said waveguide, wherein said forming of said waveguide structure forms the following features:

$$H-4 \leq (W-3)^2; \quad (1)$$

$$H-1 \geq (W-4)^2; \quad (2)$$

$$H \leq 1.7*h+2.9; \text{ and} \quad (3)$$

$$H \geq 0.87*h+1.8, \text{ and} \quad (4)$$

wherein * represents multiplication.

16. The method in claim 15, wherein said forming of said waveguide forms the following features:

$$H-4 < (W-3)^2; \quad (1)$$

$$H-1 > (W-4)^2; \quad (2)$$

$$H < 1.7*h+2.9; \text{ and} \quad (3)$$

$$H > 0.87*h+1.8. \quad (4)$$

17. The method according to claim 15, wherein said forming of said waveguide structure provides a transverse electric-transverse magnetic (TE-TM) wavelength shift within 0.2 nm.

18. The method according to claim 15, wherein said forming of said waveguide structure forms:

said waveguide height (H) to be from about 2 um to about 7 um above said substrate;

said waveguide width (W) to be from about 2 um to about 7 um between opposing sides of said waveguide; and said base height (h) to be from about 1 um to about 3 um.

19. The method according to claim 15, wherein said forming of said waveguide structure forms:

said waveguide height (H) to be from about 3 um to about 7 um above said substrate;

said waveguide width (W) to be from about 4 um to about 7 um between opposing sides of said waveguide; and said base height (h) to be from about 1.5 um to about 2.5 um.

20. The method according to claim 15, wherein said forming of said waveguide structure forms:

said waveguide height (H) to be about 5 um above said substrate;

said waveguide width (W) to be about 6 um between opposing sides of said waveguide; and said base height (h) to be about 2 um.

21. The method according to claim 15, wherein said waveguide structure comprises silicon comprising one of single crystal silicon and polycrystal silicon, wherein said silicon is one of doped and undoped, and wherein said substrate comprises an insulator comprising one of an oxide, a nitride, and a glass.

* * * * *